United States Patent
Stromquist et al.

(10) Patent No.: US 10,428,613 B2
(45) Date of Patent: Oct. 1, 2019

(54) WELLBORE CHARACTERISTIC MEASUREMENT ASSEMBLY

(71) Applicant: NCS MULTISTAGE INC., Calgary (CA)

(72) Inventors: Marty Stromquist, Calgary (CA); John Edward Ravensbergen, Calgary (CA); Lyle Laun, Calgary (CA); Michael Werries, Calgary (CA); Rob Standen, Calgary (CA); Tim Johnson, Calgary (CA)

(73) Assignee: NCS Multistage Inc., Calgary (CA)

( * ) Notice: Subject to any disclaimer, the term of this patent is extended or adjusted under 35 U.S.C. 154(b) by 121 days.

(21) Appl. No.: 15/430,645

(22) Filed: Feb. 13, 2017

(65) Prior Publication Data

US 2017/0247965 A1    Aug. 31, 2017

Related U.S. Application Data

(60) Provisional application No. 62/294,601, filed on Feb. 12, 2016.

(51) Int. Cl.
*E21B 27/00* (2006.01)
*E21B 34/06* (2006.01)
*E21B 47/10* (2012.01)
*E21B 47/12* (2012.01)
*G01V 11/00* (2006.01)

(52) U.S. Cl.
CPC ............. *E21B 27/00* (2013.01); *E21B 34/06* (2013.01); *E21B 47/1015* (2013.01); *E21B 47/12* (2013.01); *G01V 11/002* (2013.01)

(58) Field of Classification Search
CPC ...... E21B 27/00; E21B 47/12; E21B 47/1015; E21B 34/06; E21B 23/00; E21B 2023/008; E21B 23/04; E21B 23/08; E21B 23/10; E21B 47/00; E21B 47/01; G01V 11/002
See application file for complete search history.

(56) References Cited

U.S. PATENT DOCUMENTS

| | | | |
|---|---|---|---|
| 6,745,833 B2 * | 6/2004 | Aronstam | E21B 47/01 166/250.11 |
| 8,215,164 B1 | 7/2012 | Hussain et al. | |
| 2002/0171560 A1 * | 11/2002 | Ciglenec | E21B 7/061 340/853.1 |
| 2004/0084180 A1 | 5/2004 | Shah et al. | |
| 2014/0208842 A1 | 7/2014 | Miller et al. | |
| 2015/0160366 A1 * | 6/2015 | Bespalov | G01V 3/24 324/356 |
| 2016/0084075 A1 * | 3/2016 | Ingraham | E21B 23/10 166/255.1 |
| 2016/0312579 A1 * | 10/2016 | Green | E21B 34/10 |

* cited by examiner

*Primary Examiner* — Brad Harcourt
(74) *Attorney, Agent, or Firm* — Ridout & Maybee LLP

(57) ABSTRACT

There is provided a wellbore characteristic measurement assembly comprising a dispensing mechanism and a plurality of the wellbore characteristic measurement apparatuses. Each one of the wellbore characteristic measurement apparatuses, independently, is mountable to the dispensing mechanism in a releasably retained condition. The dispensing mechanism is configured for serially dispensing each one of the wellbore characteristic measurement apparatuses, independently, into the wellbore.

23 Claims, 11 Drawing Sheets

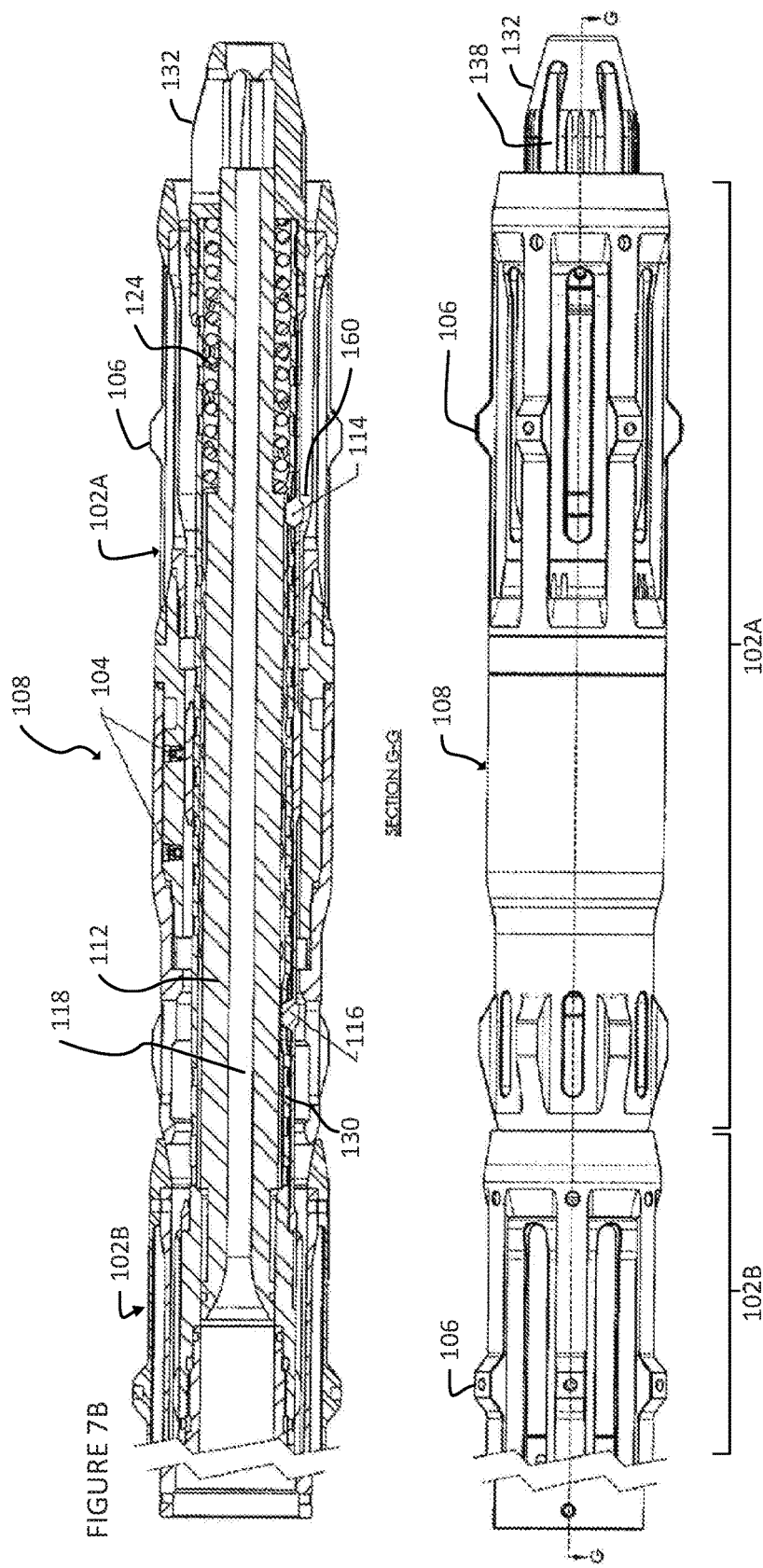

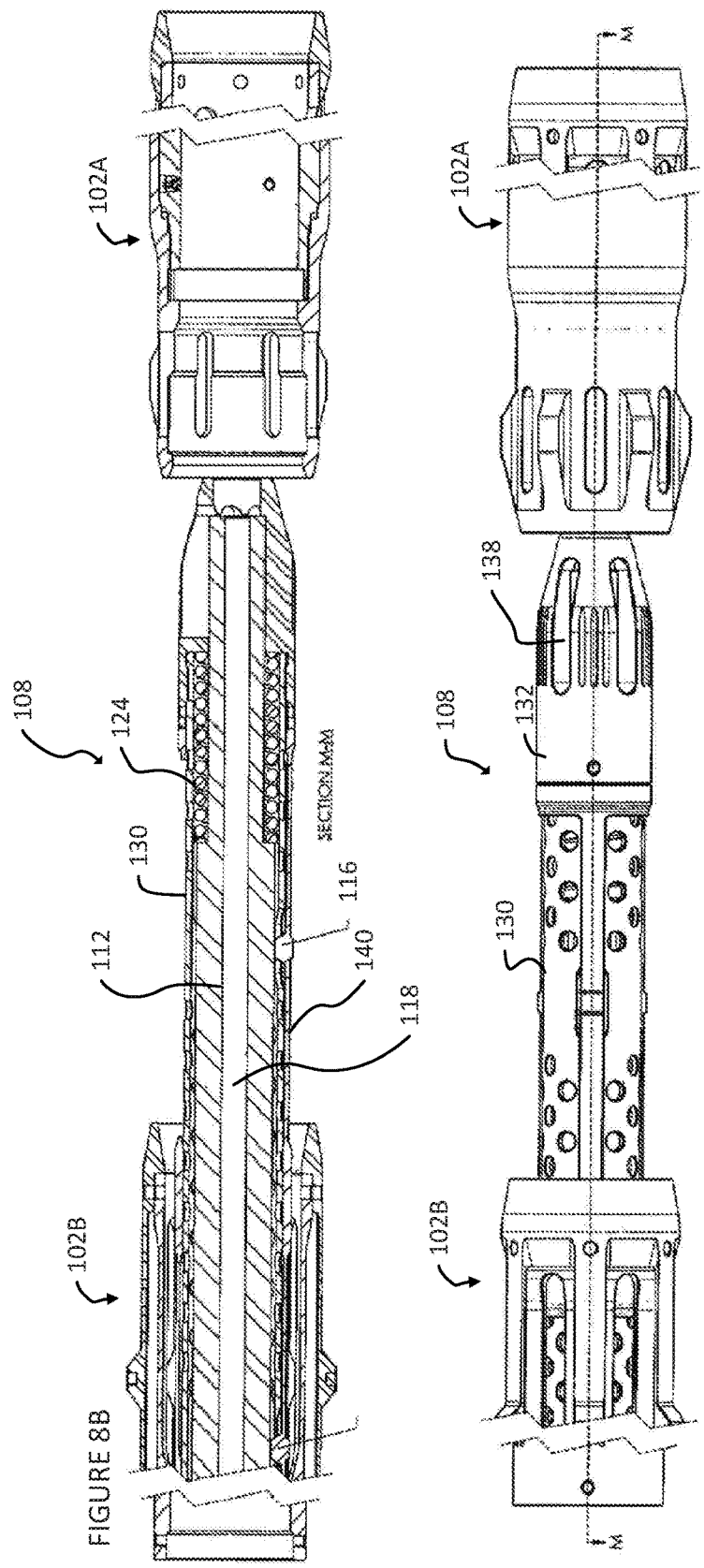

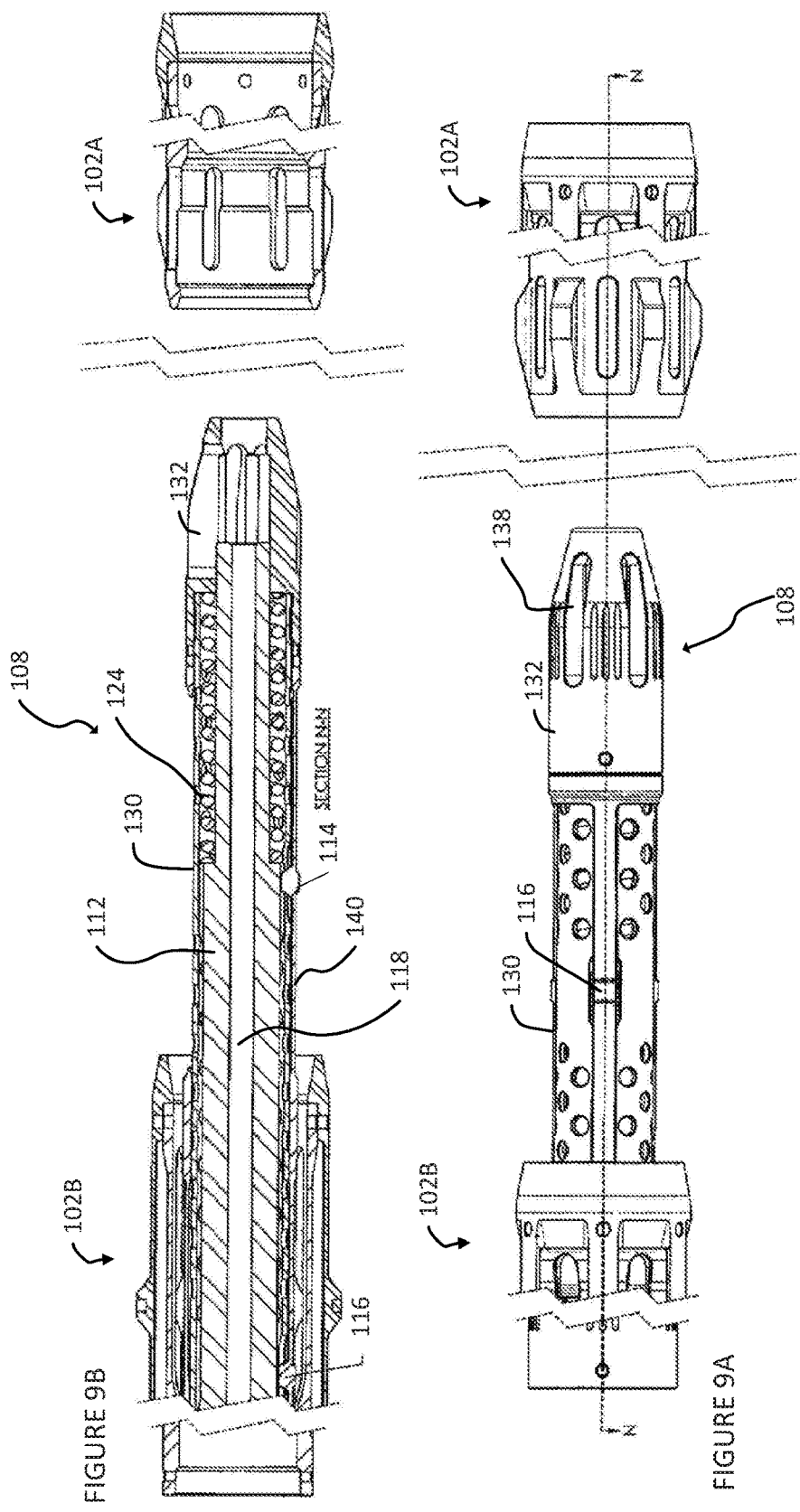

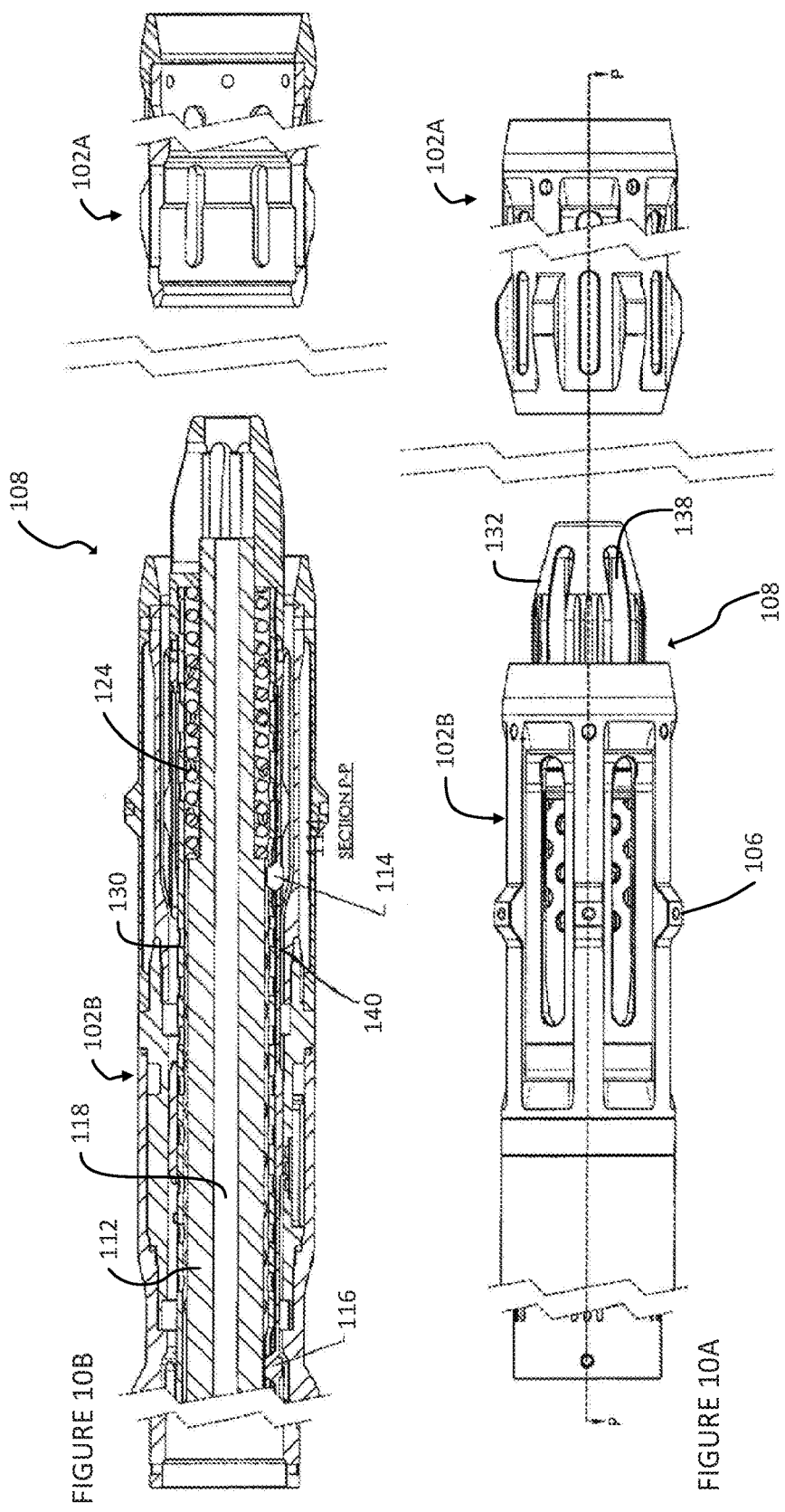

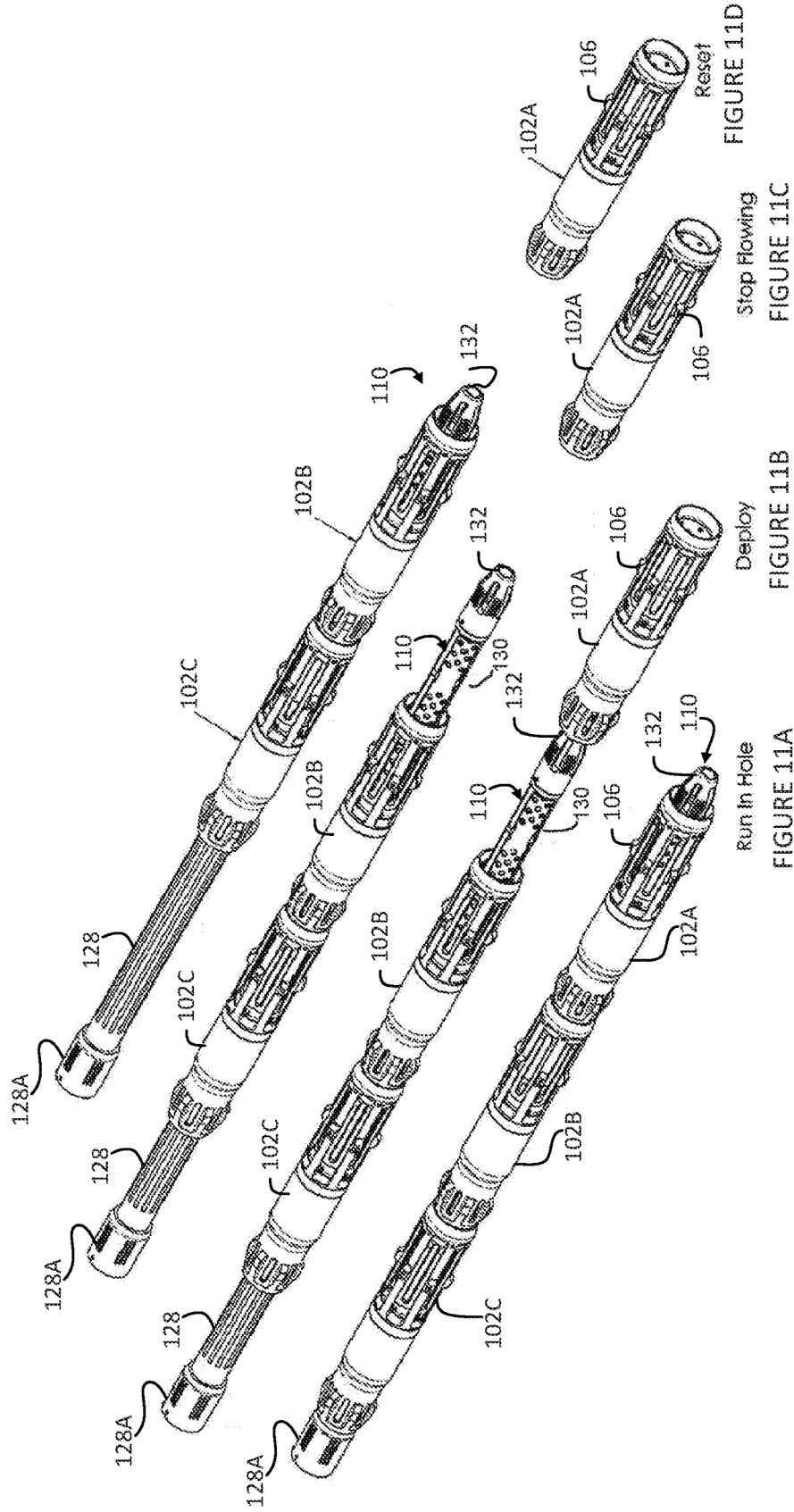

WELLBORE CHARACTERISTIC MEASUREMENT ASSEMBLY

FIELD

The present disclosure relates to apparatuses for sensing wellbore characteristics within a wellbore.

BACKGROUND

Apparatuses for sensing wellbore characteristics are not entirely reliable for collecting and providing data that is representative of wellbore conditions.

SUMMARY

In one aspect, there is provided a wellbore characteristic measurement assembly comprising a dispensing mechanism and a plurality of the wellbore characteristic measurement apparatuses wherein each one of the wellbore characteristic measurement apparatuses, independently, is mountable to the dispensing mechanism in a releasably retained condition and the dispensing mechanism is configured for serially dispensing each one of the wellbore characteristic measurement apparatuses, independently, into the wellbore.

In another aspect, there is provided a retrievable wellbore characteristic measurement apparatus configured for deployment within, and retrieval from, a wellbore, comprising a sensor; and a realeasable coupler for effecting releasable coupling of the wellbore characteristic measurement apparatus to a wellbore feature.

In another aspect, there is provided a retrievable wellbore characteristic measurement apparatus configured for deployment within, and retrieval from, a wellbore, comprising: a chemical tracer apparatus for releasing a chemical tracer into wellbore fluids, and a realeasable coupler for effecting releasable retention of the wellbore characteristic measurement apparatus to a wellbore feature.

In another aspect, there is provided a process for controlling the production of reservoir fluids from a reservoir, comprising sensing one or more wellbore fluid characteristics with a wellbore characteristic measurement apparatus disposed within a wellbore determining a high oil-water interface based on the sensed one or more wellbore fluid characteristics within a wellbore and modulating material flow between the reservoir and the wellbore via a flow communication station that is disposed in close proximity to the wellbore characteristic measurement apparatus that has sensed the one or more wellbore fluid characteristics upon which the determination of the high oil-water interface is based.

BRIEF DESCRIPTION OF THE DRAWINGS

The preferred embodiments will now be described with the following accompanying drawings, in which:

FIG. 7A is a side view of the wellbore characteristic measurement assembly, with the dispensing mechanism disposed in a dispensing prevention position;

FIG. 7B is a sectional view of the assembly in FIG. 7A, taken along lines G-G;

FIG. 8A is a side view of the wellbore characteristic measurement assembly, with the dispensing mechanism having become disposed in a dispensing promotion position in response to application of a pressure differential generated by fluid flow, with a wellbore characteristic measurement apparatus in the process of being deployed, and the succeeding wellbore characteristic measurement apparatus is being retained;

FIG. 8B is a sectional view of the assembly in FIG. 8A, taken along lines M-M;

FIG. 9A is a side view of the wellbore characteristic measurement assembly, with the dispensing mechanism disposed in a dispensing promotion position, with the wellbore characteristic measurement apparatus, in the process of being deployed in FIGS. 8A and 8B, now having been deployed, the succeeding wellbore characteristic measurement apparatus still being retained, and with the fluid flow, having urged displacement of the actuator to the dispensing promotion position, now having become suspended;

FIG. 9B is a sectional view of the assembly in FIG. 9A, taken along lines N-N;

FIG. 10A is a side view of the wellbore characteristic measurement assembly, with the dispensing mechanism being reset to the dispensing prevention position by the return spring, and with the succeeding wellbore characteristic measurement apparatus having been displaced by frictional forces applied by the wellbore string as the wellbore characteristic measurement assembly has been displaced uphole;

FIG. 10B is a sectional view of the assembly in FIG. 10A, taken along lines P-P;

FIG. 11A, is a perspective view of the conditions of the wellbore characteristic measurement assembly illustrated in FIGS. 7A and 7B;

FIG. 11B, is a perspective view of the conditions of the wellbore characteristic measurement assembly illustrated in FIGS. 8A and 8B;

FIG. 11C, is a perspective view of the conditions of the wellbore characteristic measurement assembly illustrated in FIGS. 9A and 9B; and FIG. 11D, is a perspective view of the conditions of the wellbore characteristic measurement assembly illustrated in FIGS. 10A and 10B.

DETAILED DESCRIPTION

As used herein, the terms "up", "upward", "upper", or "uphole", mean, relativistically, in closer proximity to the surface and further away from the bottom of a wellbore 14, when measured along the longitudinal axis of the wellbore 14. The terms "down", "downward", "lower", or "downhole" mean, relativistically, further away from the surface and in closer proximity to the bottom of the wellbore, when measured along the longitudinal axis of the wellbore 14. Suitable wellbores 14 include vertical, horizontal, deviated or multi-lateral wells.

Figure 1:
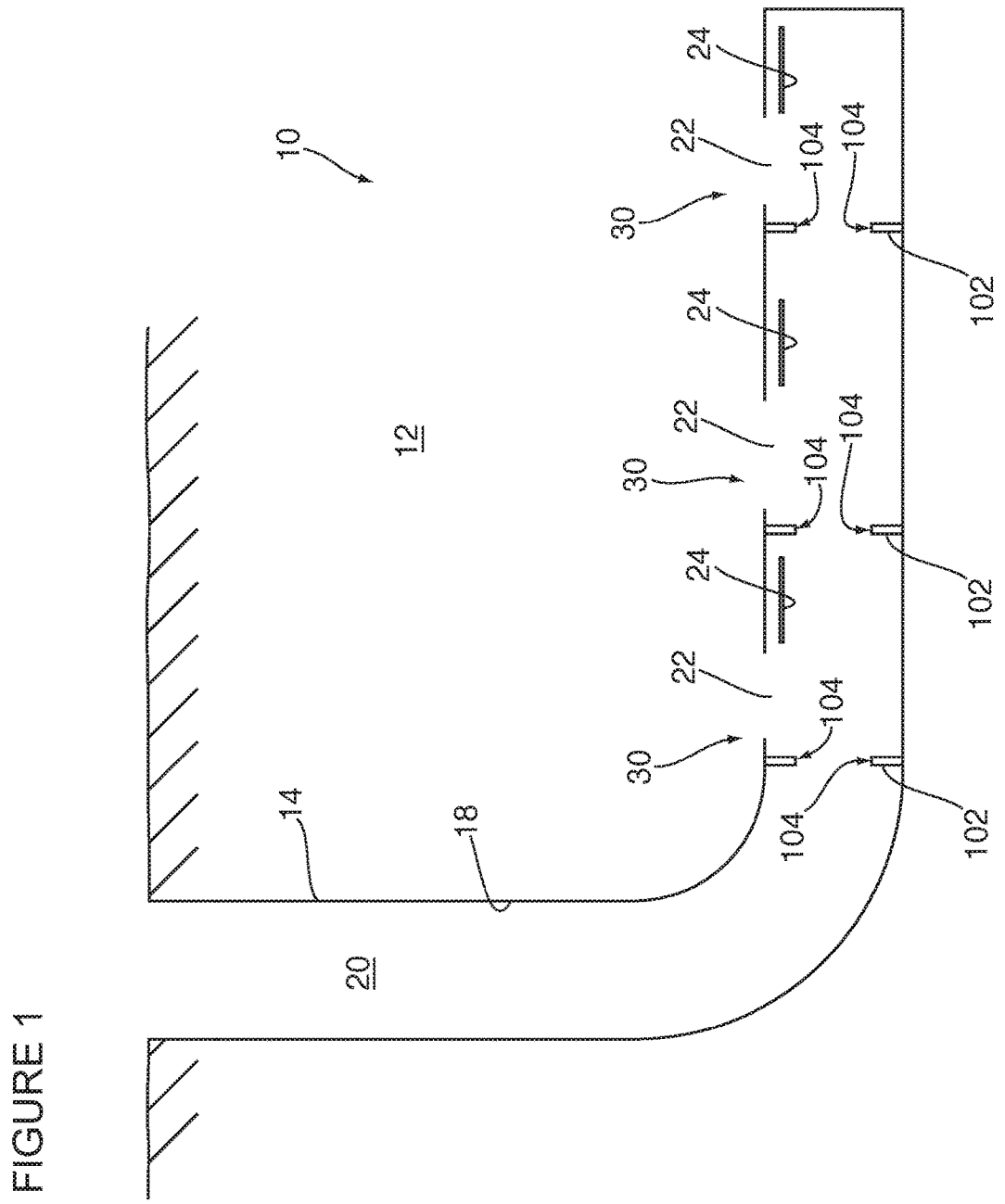
FIG. 1 is a schematic illustration of a wellbore characteristic measurement system.

Referring to FIG. 1, there is provided a wellbore material transfer system 10 for conducting material to a subterranean formation 12 via a wellbore 14, from a subterranean formation 12 via a wellbore 14, or both to and from a subterranean formation 12 via a wellbore 14. In some embodiments, for example, the subterranean formation 12 is a hydrocarbon material-containing reservoir.

In some embodiments, for example, the conducting (such as, for example, by flowing) material to a subterranean formation 12 via a wellbore 14 is for effecting selective stimulation of a hydrocarbon material-containing reservoir. The stimulation is effected by supplying treatment material to the hydrocarbon material-containing reservoir. In some embodiments, for example, the treatment material is a liquid including water. In some embodiments, for example, the liquid includes water and chemical additives. In other embodiments, for example, the treatment material is a slurry including water, proppant, and, optionally, chemical additives. Exemplary chemical additives include acids, sodium chloride, polyacrylamide, ethylene glycol, borate salts, sodium and potassium carbonates, glutaraldehyde, guar gum and other water soluble gels, citric acid, and isopropanol. In some embodiments, for example, the treatment material is supplied to effect hydraulic fracturing of the reservoir. In some embodiments, for example, the treatment material includes water, and is supplied to effect waterflooding of the reservoir.

In some embodiments, for example, the conducting (such as, for example, by flowing) material from a subterranean formation 12 via a wellbore 14 is for effecting production of hydrocarbon material from the hydrocarbon material-containing reservoir. In some of these embodiments, for example, the hydrocarbon material-containing reservoir, whose hydrocarbon material is being produced by the conducting via the wellbore 14, has been, prior to the producing, stimulated by the supplying of treatment material to the hydrocarbon material-containing reservoir.

In some embodiments, for example, the conducting to the subterranean formation 12 from the wellbore 14, or from the subterranean formation 12 to the wellbore 14, is effected via one or more flow communication stations 30 that are disposed at the interface between the subterranean formation 12 and the wellbore 14. In some embodiments, for example, the flow communication stations are integrated within a wellbore string 18 that is disposed within the wellbore 14. Integration may be effected, for example, by way of threading or welding.

The wellbore string 18 may include pipe, casing, or liner, and may also include various forms of tubular segments, such as the flow communication stations described herein. The wellbore string 18 defines a wellbore string passage 20.

Successive flow communication stations 30 may be spaced from each other along the wellbore string 18 such that each flow communication stations 30 is positioned adjacent a zone or interval of the subterranean formation 12 for effecting flow communication between the wellbore 14 and the zone (or interval).

For effecting the flow communication, the flow communication station 30 includes one or more ports 22 through which the conducting of the material is effected. In some embodiments, for example, the ports 22 are disposed within a sub that has been integrated within the wellbore string 18, and are pre-existing, in that the ports 22 exists before the sub, along with the wellbore string 18, has been installed downhole within the wellbore string 18. In some embodiments, for example, the ports 22 are defined by perforations within the wellbore string 18, and the perforations are created after the wellbore string 18 has been installed within the wellbore string 18, such as by a perforating gun.

In some embodiments, for example, the flow communication station 30 includes a flow control member 24 for controlling the conducting of material by the flow communication station via the one or more ports 22. The flow control member 24 is displaceable, relative to the one or more ports 22, for effecting opening and closing of the one or more ports 22. In this respect, the flow control member 24 is displaceable such that the flow control member 24 is positionable in open and closed positions. The open position of the flow control member 24 corresponds to an open condition of the one or more ports 22. The closed position of the flow control member 24 corresponds to a closed condition of the one or more ports 22.

In some embodiments, for example, in the closed position, the one or more ports 22 are covered by the flow control member 24, and the displacement of the flow control member 24 to the open position effects at least a partial uncovering of the one or more ports 22 such that the flow control apparatus port 22 becomes disposed in the open condition. In some embodiments, for example, in the closed position, the flow control member 24 is disposed, relative to the one or more ports 22, such that a sealed interface is disposed between the wellbore 14 and the subterranean formation 12, and the disposition of the sealed interface is such that the conduction of material between the wellbore 14 and the subterranean formation 12, via the flow communication station is prevented, or substantially prevented, and displacement of the flow control member 24 to the open position effects flow communication, via the one or more ports 22, between the wellbore 14 and the subterranean formation 12, such that the conducting of material between the wellbore 14 and the subterranean formation 12, via the flow communication station, is enabled. In some embodiments, for example, the sealed interface is established by sealing engagement between the flow control member 24 and the wellbore string 18. In some embodiments, for example, the flow control member 24 includes a sleeve. The sleeve is slideably disposed within the wellbore string passage 20.

The flow control member 24 is configured for displacement, relative to the flow control apparatus port 22, in response to application of a sufficient force. In some embodiments, for example, the application of a sufficient force is effected by a sufficient fluid pressure differential that is established across the flow control member 24. In some embodiment embodiments, for example, for example, the sufficient force is established by a force, applied to a shifting tool (such as via coiled tubing), and then transmitted, via the shifting tool, to the flow control member 24.

A wellbore characteristic measurement system 100 is coupled to the wellbore 14 for sensing at least one wellbore string characteristic and producing a value representative of a wellbore condition based on the sensed at least one wellbore characteristic. In some embodiments, for example, the wellbore characteristic is a characteristic of a wellbore fluid. In some embodiments, for example, the wellbore condition includes a height of a fluid phase interface in a section of a wellbore 14, a fluid flow in a section of the wellbore 14, a direction of flow in a section of the wellbore 14, location at which fluid is being injected into the subterranean formation 12, and a composition of fluid in a section of the wellbore 14.

The wellbore characteristic measurement system 100 includes one or more wellbore characteristic measurement apparatuses 102 (see FIGS. 3A to 3E). The wellbore characteristic measurement apparatus 102 is integratable within the wellbore string 18. In some embodiments, for example, the wellbore characteristic measurement apparatus 102 is configured for sensing at least one wellbore characteristic. In some embodiments, for example, the wellbore characteristic is a wellbore characteristic that is local to, such as, for example, adjacent to, the wellbore characteristic measurement apparatus 102. In some embodiments, for example, the wellbore characteristic measurement apparatus 102 is configured, for each one of the sensed at least one wellbore characteristic, independently, to produce a signal representative of the sensed wellbore characteristic.

In some embodiments, for example, the wellbore characteristic measurement apparatus 102 is tubular and defines a passage 1021 extending between first and second ends 1022, 1023, to enable flow communication through the wellbore string 18 and across the wellbore characteristic measurement apparatus 102.

In some embodiments, for example, the wellbore characteristic measurement apparatus 102 includes a housing 1025 for housing one or more sensors 104. Each one of the one or more sensors 104, independently, is configured for sensing at least one wellbore characteristic. In some embodiments, for example, for each one of the one or more sensors 104, independently, each one of the at least one wellbore characteristic, independently, is a wellbore string characteristic that is local to, such as, for example, adjacent to, the sensor 104.

In some embodiments, for example, the wellbore characteristic measurement apparatus 102 includes a plurality of the sensors 104, and the sensors 104 are spaced apart relative to one another. In some embodiments, for example, the sensors 104 are spaced apart sensors 104 for being disposed at different vertical positions within the wellbore string 18. In some embodiments, for example, the sensors 104 are spaced-apart circumferentially relative to one another.

An exemplary sensor 104 includes a thermistor.

In some embodiments, for example, the wellbore characteristic measurement apparatus 102 includes an accelerometer 1030 within the housing 1025 to sense orientation of the apparatus, once deployed within the wellbore 14, to provide a better understanding of the data that is collected, by accounting for the orientation of the wellbore section within which the wellbore characteristic measurement apparatus may be positioned. In this respect, the orientation data is correlated with the information sensed by the sensors 104.

In some embodiments, for example, the wellbore characteristic measurement apparatus 102 includes a chemical tracer apparatus 105 for releasing a chemical tracer into wellbore fluid. The chemical tracer apparatus 105 contains chemical tracer. The chemical tracer apparatus 105 is retained by the housing 1025 and is disposed in fluid communication with the passage 1021. In some embodiments, for example, the chemical tracer apparatus 105 is degradable in wellbore fluid. In this respect, when the chemical tracer apparatus 105 is exposed to wellbore fluid, the chemical tracer apparatus 105 degrades, thereby releasing chemical tracer that is contained within the chemical tracer apparatus 105. In some embodiments, for example, the wellbore characteristic measurement apparatus 102 is selectively deployed within an injection well, and the chemical tracer is released into production stimulating fluid (such as for example, fluid including water or steam) being injection via an injection well into a subterranean reservoir for simulating hydrocarbon production from the reservoir via a production well. Upon collection via reservoir fluids produced via the production well, the chemical tracer would provide information relating to the degree to which production stimulating fluid, injected through a selected flow communication station 30, is succeeding in stimulating hydrocarbon production.

In some embodiments, for example, the wellbore characteristic measurement apparatus 102 includes a coupler 106 for releasable retention to a wellbore feature within the wellbore 14. In this respect, the wellbore characteristic measurement apparatus 102, while retained by the wellbore feature within the wellbore, is releasable from the wellbore feature and retrievable from the wellbore 14. In some embodiments, for example, the coupler 106 includes a resilient engaging means, such as a collet spring 140, for frictionally engaging the wellbore string 18 and resisting displacement relative to the wellbore string 18 along a longitudinal axis of the wellbore string 18.

In those embodiments where the wellbore characteristic measurement apparatus 102 includes a coupler 106 for releasable coupling to a wellbore feature within the wellbore 14, in some of these embodiments, for example, the wellbore characteristic measurement apparatus 102 includes a data storage device 1032 within the housing 1025 for storing one or more values, wherein each one of the one or more values, independently, is representative of a respective one of the signals produced by the wellbore characteristic measurement apparatus 102 based on a one of the sensed at least one wellbore characteristic. The one or more values are stored for subsequent processing, after the wellbore characteristic measurement apparatus 102 has been retrieved and returned to the surface, to determine one or more wellbore conditions, such as the height of one or more fluid phase interfaces, fluid flow in one or more sections of the wellbore 14, fluid flow direction in one or more sections of the wellbore 14, one or more locations at which fluid is being injected into the subterranean formation 12, and fluid composition in one or more sections of the wellbore 14. In some embodiments, for example, the above-described orientation data is correlated with the one or more values and is also stored on the data storage device.

In some embodiments, for example, the wellbore characteristic measurement apparatus 102 is integrated within the wellbore string 18, and a communication subsystem is provided to transmit signals from the wellbore characteristic measurement apparatus 102 to the surface (and, in some embodiments, for example, providing power to the wellbore characteristic measurement apparatus 102). In some embodiments, for example, the communication subsystem includes a communication cable that is integrated within the wellbore string 18.

In some embodiments, for example, a plurality of wellbore characteristic measurement apparatuses 102 are integrated within the wellbore string 18. In some of these embodiments, for example, for each one of the wellbore characteristic measurement apparatuses 102, independently, the integration within the wellbore string 18 is by releasable retention, as described above, and a data storage device is included for storing one or more values (wherein each one of the one or more values, independently, is representative of a respective one of the signals produced by the wellbore characteristic measurement apparatus 102 based on a one of the sensed at least one wellbore characteristic) for subsequent processing, after the wellbore characteristic measurement apparatus 102 has been retrieved and returned to the surface, to determine one or more wellbore conditions. Alternatively, in some of these embodiments, for example, the wellbore characteristic measurement apparatuses 102 are integrated within the wellbore string 18, and a communication subsystem is provided to transmit signals from the wellbore characteristic measurement apparatuses 102 to the surface (and, in some embodiments, for example, providing power to the wellbore characteristic measurement apparatuses 102), such as via a communication cable that is integrated within the wellbore string 18.

In those embodiments where a plurality of wellbore characteristic measurement apparatuses 102 are integrated within the wellbore string 18, in some of these embodiments, for example, each one of the plurality of wellbore characteristic measurement apparatuses 102, independently, is disposed in close proximity to a respective one of the flow communication stations of the wellbore string 18, such that, for each one of the flow communication stations, a condition of the fluid being conducted between the subterranean formation 12 and the wellbore 14 via the flow communication station is derivable from the at least one fluid characteristic that is sensed by the wellbore characteristic measurement apparatus 102 to which the flow communication station is respective.

In practice, in some embodiments, for example, in response to the sensing by the plurality of wellbore characteristic measurement apparatuses 102, modulation of the material (e.g. fluid) flow being conducted via one or more flow communication stations is effected.

In some embodiments, for example, the modulation of material flow is modulation of material flow from the subterranean formation 12 to the wellbore 14, such as during the producing of the subterranean formation 12. In some of these embodiments, for example, the modulation is such that at least a reduction in (such as, for example, a suspension of) the material flow from the subterranean formation 12 to the wellbore 14 is effected, and such modulation is of material flow being conducted from subterranean formation 12 and to the wellbore 14 via a flow communication station that is respective to (being disposed in close proximity to) a wellbore characteristic measurement apparatus 102 that has sensed one or more fluid characteristics that are indicative of a high oil-water interface condition (i.e the height of an oil-water interface within the wellbore 14 that exceeds a predetermined level or height within the wellbore 14). A high oil-water interface is indicative of a water content within the material flow, being conducted from the subterranean formation 12 to the wellbore 14 via the respective one of the flow communication stations, that exceeds a predetermined maximum water content. In such circumstances, excessive water may be being produced from one or more zones within the subterranean formation 12, and this is sensed by wellbore characteristic measurement apparatuses 102 that are associated with such zones, and, in response, the material flow from such one or more zones is reduced or suspended so as to minimize the amount of water being produced from the subterranean formation 12 along with the hydrocarbon material. It is desirable to minimize water production and produced water would otherwise be required to be separated from the produced hydrocarbon material. In some embodiments, for example, where the modulating includes displacement of the flow control member 24 of the flow communication station such that at least increased obstruction of the one or more ports 22 is effected.

Figure 2:
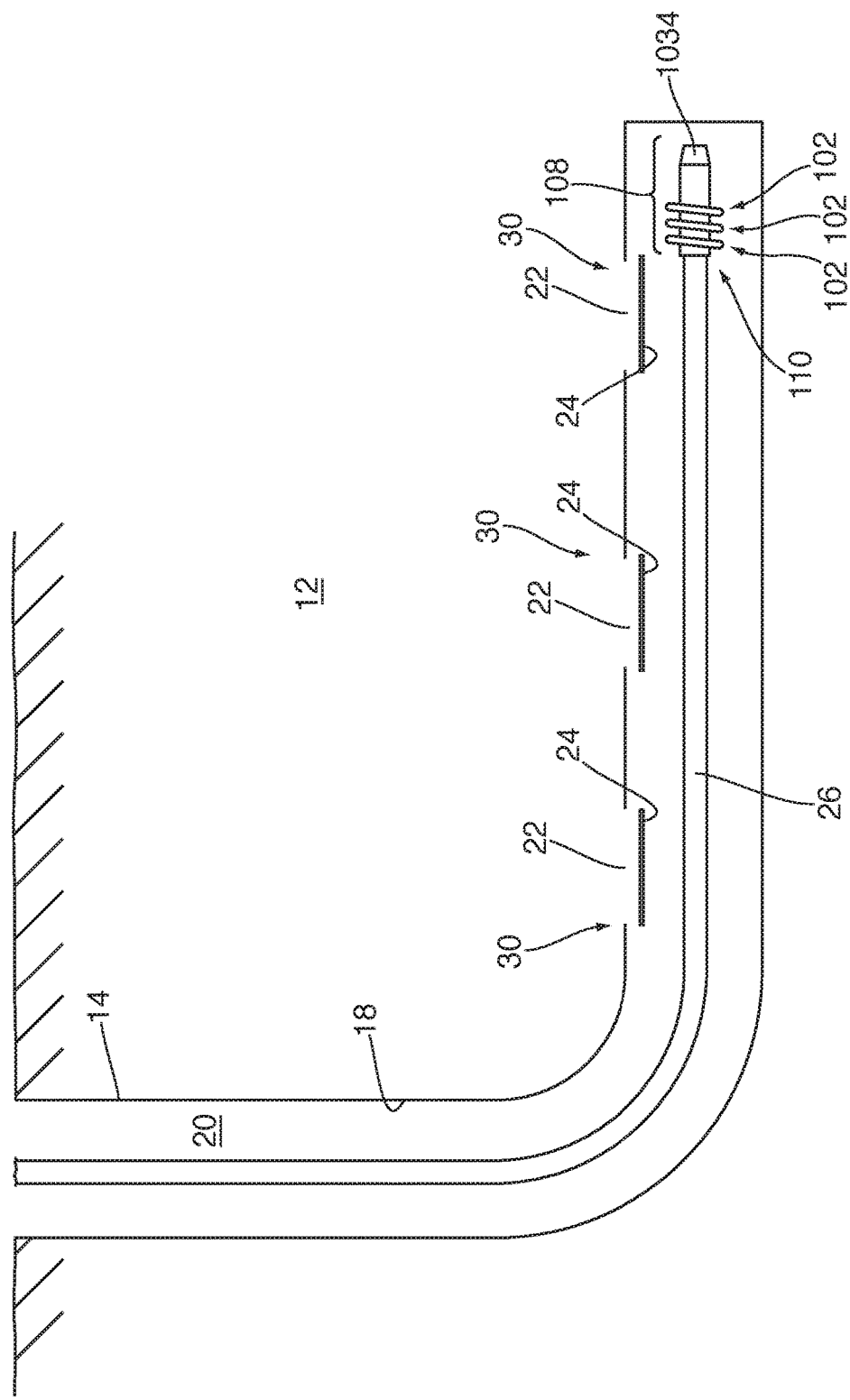
FIG. 2 is a schematic illustration of a series of wellbore characteristic measurement apparatuses being deployed within a wellbore.
Figure 3:
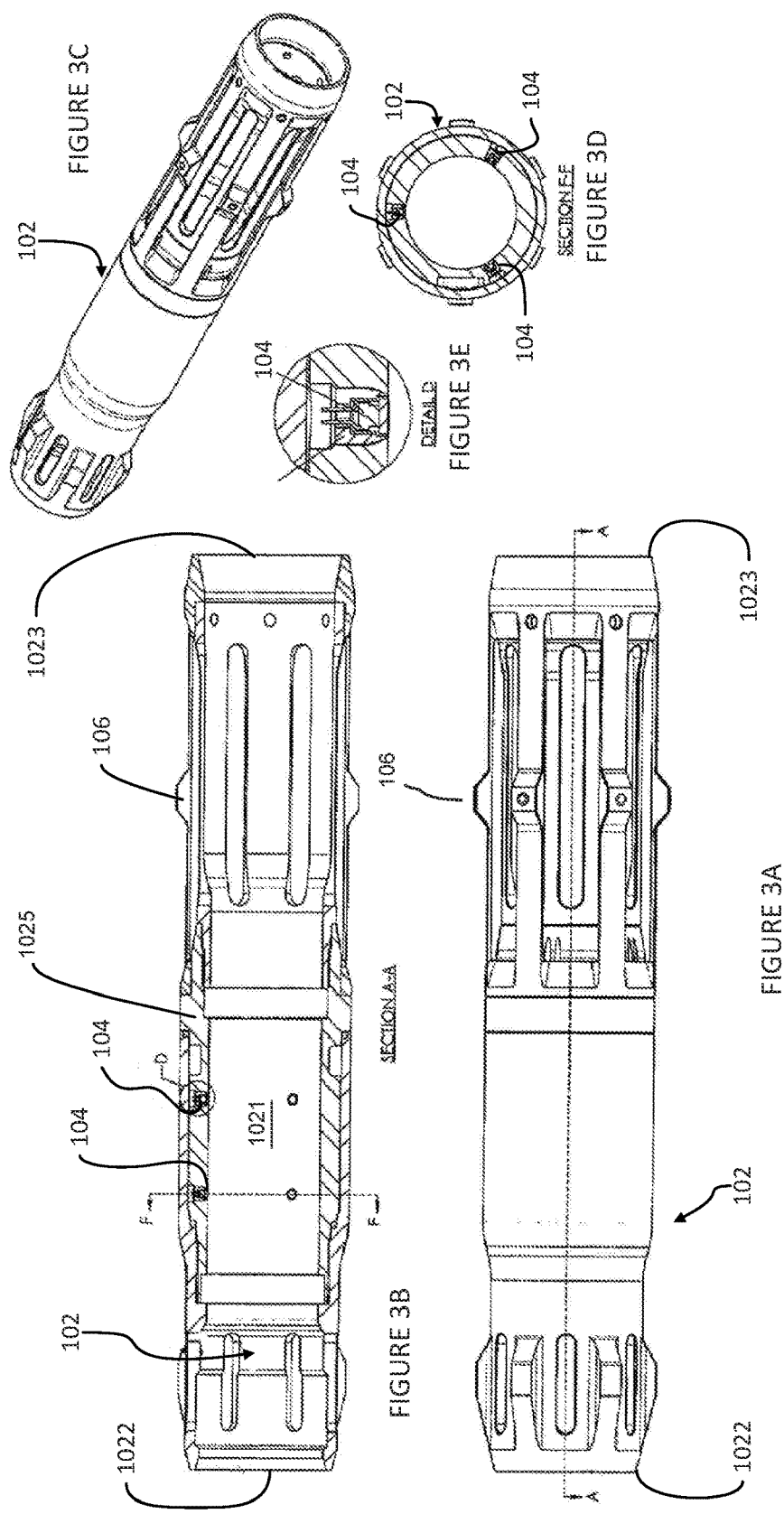
FIG. 3A is a side view of a wellbore characteristic measurement apparatus.
FIG. 3B is a sectional view of the wellbore characteristic measurement apparatus in FIG. 3A, taken along the lines A-A in FIG. 3A.
FIG. 3C is a perspective view of the wellbore characteristic measurement apparatus in FIG. 3A.
FIG. 3D is a sectional end view of the wellbore characteristic measurement apparatus in FIG. 3A, taken along lines F-F in FIG. 3B.
FIG. 3E is an enlarged view of Detail "D" in FIG. 3B.
FIG. 3F is a schematic illustration of a portion the wellbore characteristic measurement apparatus disposed within a wellbore.
Figure 4:
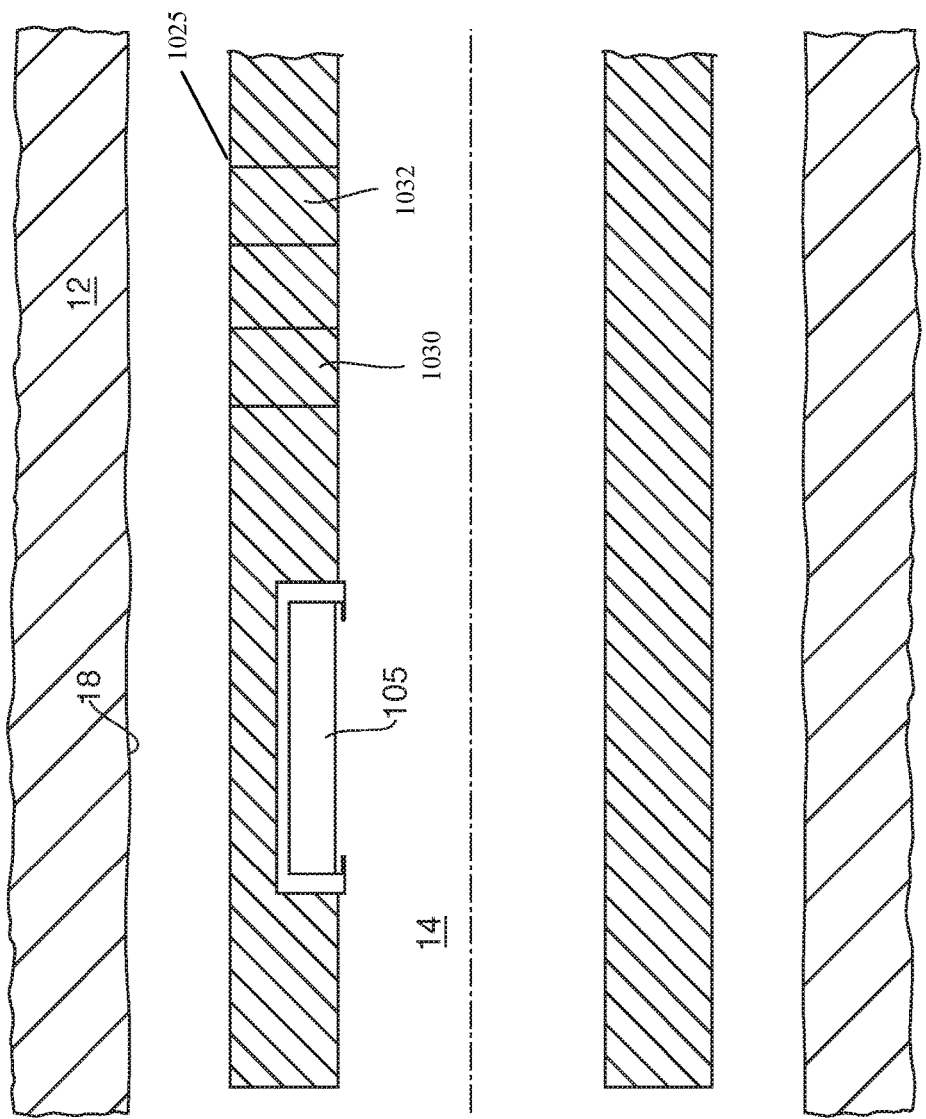
FIG. 4A is a side view of a dispensing mechanism in a dispensing prevention position.
FIG. 4B is a sectional view of the dispensing mechanism in FIG. 4A, taken along lines B-B in FIG. 4A.
FIG. 4C is an enlarged view of Detail "C" in FIG. 4B.
Figure 5:
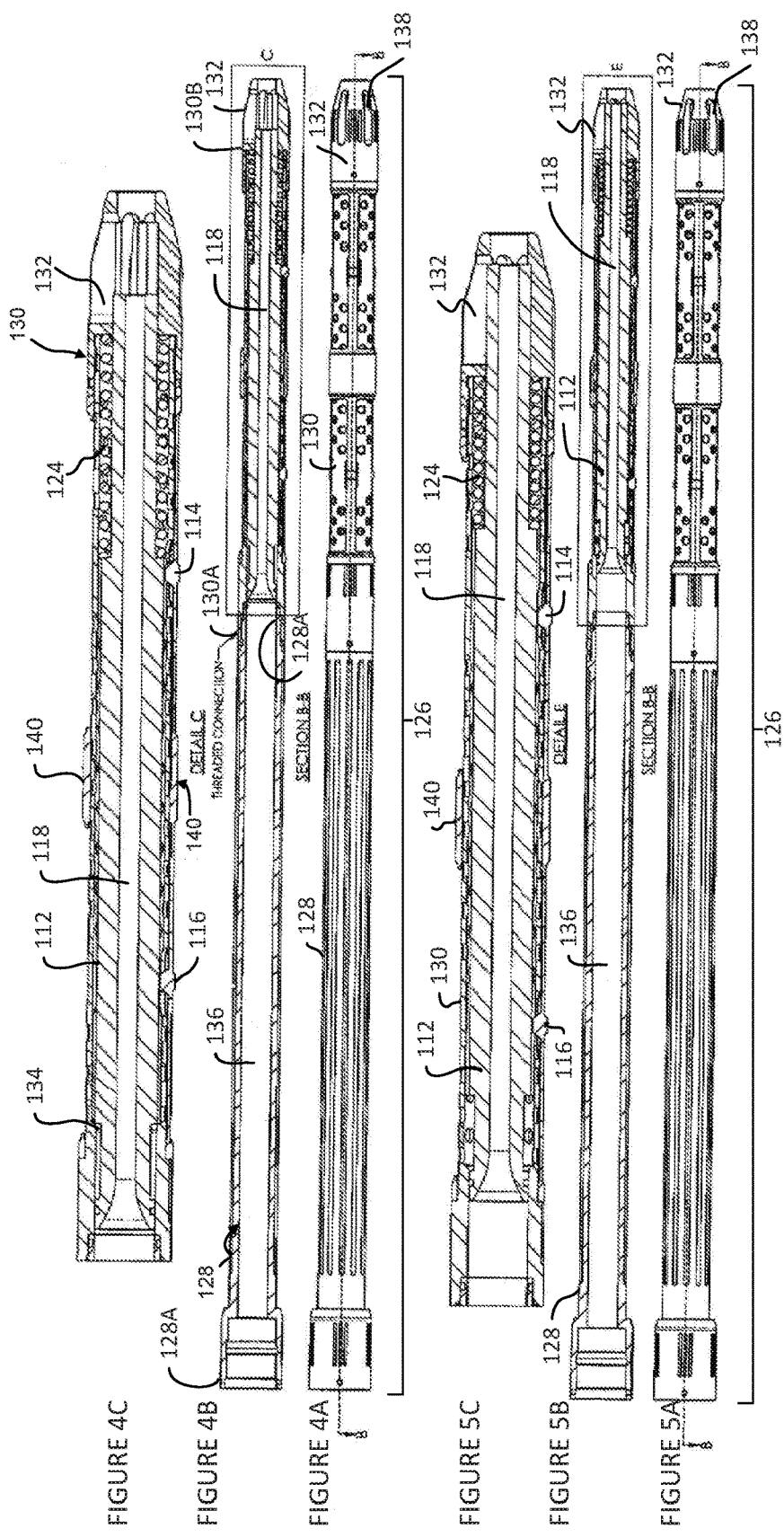
FIG. 5A is a side view of a dispensing mechanism in a dispensing promotion position.
FIG. 5B is a sectional view of the dispensing mechanism of FIG. 5A, taken along lines B-B in FIG. 5A.
FIG. 5C is an enlarged view of Detail "D" in FIG. 5B.
Figure 6:
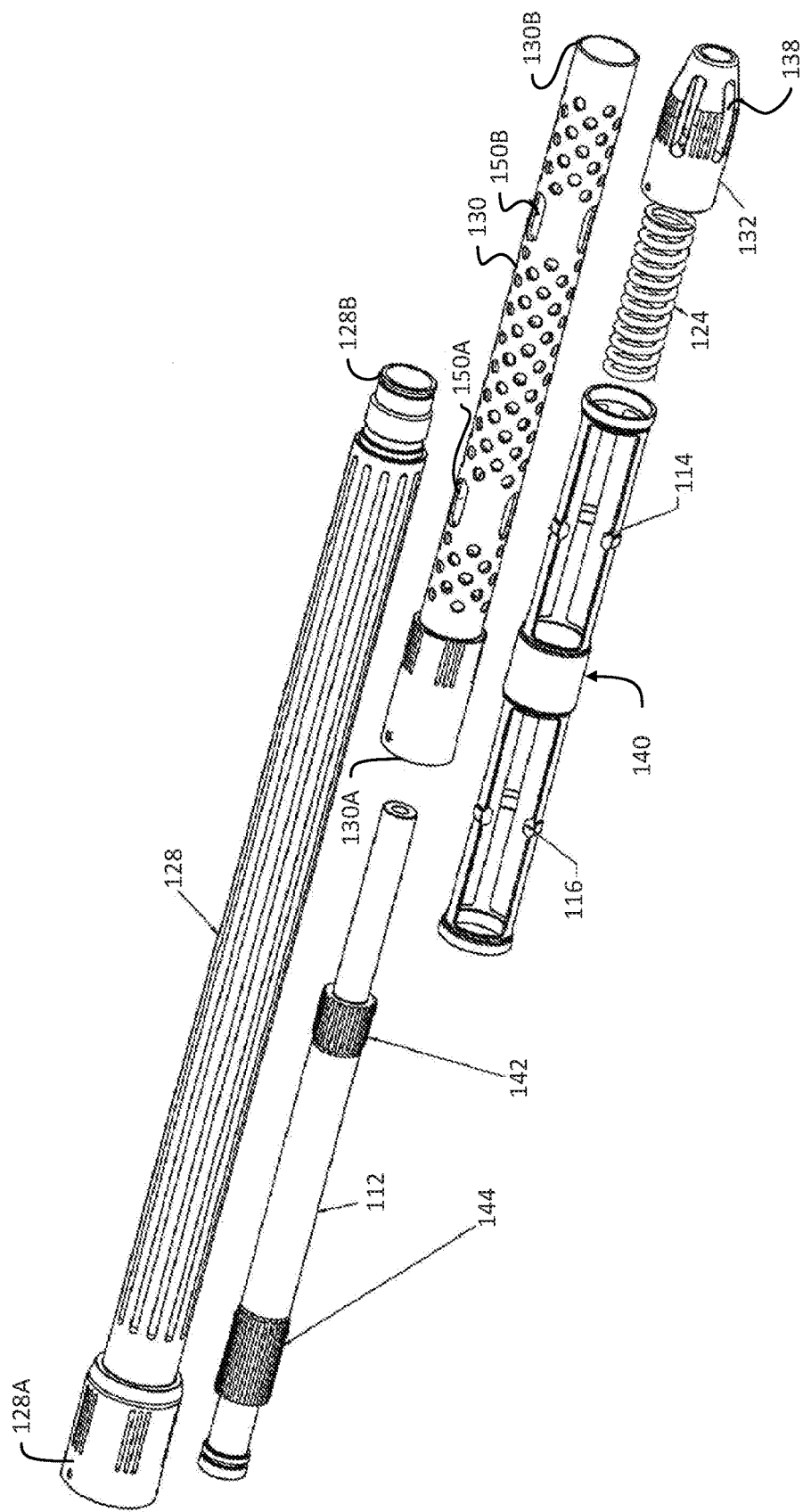
FIG. 6 is an exploded view of the dispensing mechanism illustrated in FIGS. 4A, 4B, and 4C, and 5A, 5B, and 5C.

Referring to FIG. 2, in some embodiments, for example, a wellbore characteristic measurement assembly 108 is provided and is deployable within the wellbore 14. In some embodiments, for example, the assembly 108 includes an integrated magnetic collar locator 1034 for enabling the counting of collars in the wellbore string 18 as the assembly 108 is being moved through the wellbore 14, thereby facilitating position of the assembly 108 at a predetermined location within the wellbore 14 for dispensing of a wellbore characteristic measurement apparatus 102 at such location, for the releasable retention of the wellbore characteristic measurement apparatus 102 of a wellbore feature at such location.

The wellbore characteristic measurement assembly 108 is deployable through the wellbore string passage 20 of the wellbore string 18, on a workstring 26. Suitable workstring 26 include tubing string, wireline, cable, or other suitable suspension or carriage systems. Suitable tubing strings include jointed pipe, concentric tubing, or coiled tubing. The workstring 26 includes a fluid passage, extending from the surface, and disposed in, or disposable to assume, fluid communication with a passage of the wellbore characteristic measurement assembly 108.

The workstring 26 is coupled to the wellbore characteristic measurement assembly 108 such that forces applied to the workstring 26 are transmitted to the wellbore characteristic measurement assembly 108. In some embodiments, for example, the wellbore characteristic measurement assembly 108 translates with the workstring 26. In some embodiments, for example, the coupling is a threaded coupling.

The wellbore characteristic measurement assembly 108 includes a dispensing mechanism 110 (see FIGS. 4A to 4D, 5A to 5D, and 6) and a plurality of the wellbore characteristic measurement apparatuses 102. Each one of the wellbore characteristic measurement apparatuses 102, independently, is mountable to the dispensing mechanism 110 in a releasably retained condition such that the wellbore characteristic measurement apparatuses 102 become releasably retained to the dispensing mechanism 110 (see FIGS. 7A to 7D, 8A to 8D, 9A to 9D, and 10A to 10D).

The dispensing mechanism 110 is configured for serially dispensing each one of the wellbore characteristic measurement apparatuses 102, independently, from the dispensing mechanism 110 and into the wellbore 14.

In some embodiments, for example, the dispensing mechanism 110 is actuatable for dispensing each one of the wellbore characteristic measurement apparatuses 102, independently, such that the dispensing is effected one at a time.

In some embodiments, for example, the wellbore characteristic measurement apparatuses 102 are mountable to the dispensing mechanism 110 in a releasably retained condition such that the wellbore characteristic measurement apparatuses 102 become releasably retained to the dispensing mechanism 110 in a series and disposed for serial dispensing by the dispensing mechanism 110. While mounted to the dispensing mechanism 110 as the assembly 108 is being conducted through the wellbore string 18, the wellbore characteristic measurement apparatuses 102 are disposed for receiving application of frictional forces by the wellbore string 18. As well, the dispensing mechanism 110 includes an actuator 112, a first retainer 114, and a second retainer 116. The actuator 112 is displaceable between a dispensing prevention position and a dispensing promoting position, and co-operates with the first and second retainers 114, 116 for serially dispensing the releasably retained wellbore characteristic measurement apparatuses 102.

Referring to FIGS. 7A, 7B, and 11A, while the actuator 112 is disposed in the dispensing prevention position and the assembly 108 is being conducted through the wellbore 14 (e.g. being pulled uphole within the wellbore 14), the first retainer 114 is urged by the actuator 112 into a retaining position for opposing the frictional forces being applied by the wellbore string 18 to the wellbore characteristic measurement apparatuses 102 while the assembly 108 is being conducted through the wellbore 14 (e.g. being pulled uphole within the wellbore 14), such that the wellbore characteristic measurement apparatuses 102 are retained by the dispensing mechanism 110. In some embodiments, for example, in the retaining position, and while the actuator 112 is disposed in the dispensing prevention position and the assembly 108 is being conducted through the wellbore 14 (e.g. being pulled uphole within the wellbore 14), the first retainer 114 is engaged to a terminal one of the series of wellbore characteristic measurement apparatuses 102 (such as, for example, to a shoulder 134 of the terminal one of the series) such that displacement of the wellbore characteristic measurement apparatuses 102, relative to the dispensing mechanism 110, being urged by the frictional forces being applied by the wellbore string 18, is interfered with or blocked.

The actuator 112 is displaceable from the dispensing prevention position to the dispensing promotion position. Referring to FIGS. 8A, 8B, and 11B, upon the actuator 112 becoming disposed in the dispensing promotion position, the urging of the first retainer 114 into the retaining position by the actuator 112 is removed such that the first retainer 114 retracts from the retaining position and the second retainer 116 is urged by the actuator 112 into a retaining position. This is with effect that while the actuator 112 is disposed in the dispensing promoting position and the assembly 108 is being conducted through the wellbore 14 (e.g. being pulled uphole within the wellbore 14), the frictional forces, being applied by the wellbore string 18 to at least one of the terminal ones of the series of wellbore characteristic measurement apparatuses 102, effect displacement of the at least one of the terminal ones of the series of wellbore characteristic measurement apparatuses 102 such that the at least one of the terminal ones of the wellbore characteristic measurement apparatuses 102 are dispensed from the assembly 108, and the frictional forces, being applied by the wellbore string 18 to all of the other ones of the series of wellbore characteristic measurement apparatuses 102, is opposed by the second retainer 116 such that all of the other ones of the series of wellbore characteristic measurement apparatuses 102 are retained by the dispensing mechanism 110. In this respect, while one or more of the terminal ones of the series of wellbore characteristic measurement apparatuses 102 is dispensed, all of the other ones are retained. In some embodiments, for example, the at least one of the terminal ones of the series of wellbore characteristic measurement apparatuses 102 is a terminal one of the series of wellbore characteristic measurement apparatuses 102

The actuator 112 is also displaceable from the dispensing promotion position to the dispensing prevention position, after the at least one of the terminal ones of the series of wellbore characteristic measurement apparatuses 102 has been dispensed from the assembly 108 and into the wellbore string 18. Referring to FIGS. 10A, 10B, and 11D, upon the actuator 112 becoming disposed in the dispensing prevention position, the urging of the second retainer 116 into the retaining position by the actuator 112 is removed such that the second retainer 116 retracts from the retaining position and the first retainer 114 is urged by the actuator 112 into the retaining position. This is with effect that, while the actuator 112 is disposed in the dispensing prevention position and the assembly 108 is being conducted through the wellbore 14 (e.g. being pulled uphole within the wellbore 14), displacement of the non-deployed ones of the series of wellbore characteristic measurement apparatuses 102, relative to the dispensing mechanism 110, and being effected by the frictional forces being applied by the wellbore string 18 to the non-deployed ones of the series of wellbore characteristic measurement apparatuses 102, becomes limited by the first retainer 114 such that the non-deployed ones of the series of wellbore characteristic measurement apparatuses 102 become retained relative to the dispensing mechanism 110. In this respect, the dispensing mechanism 110 is re-set to the dispensing preventing position, thereby providing opportunity for the assembly 108 to locate to another position within the wellbore 14 without continuing to dispense the wellbore characteristic measurement apparatuses 102, while being poised to dispense one or more wellbore characteristic measurement apparatuses 102 upon the re-location.

As discussed above, in some embodiments, for example, the wellbore characteristic measurement apparatus 102 includes a resilient member, such as a collet spring, for frictionally engaging the wellbore string 18, and upon dispensing from the assembly 108, effecting releasable coupling of the wellbore characteristic measurement apparatus 102 to the wellbore string 18. Such releasable coupling is provided for effecting resistance to axial displacement of the wellbore characteristic measurement apparatus 102 relative to the wellbore string 18, thereby effecting positioning of the wellbore characteristic measurement apparatus 102 within the wellbore 14. In some of these embodiments, for example, the wellbore characteristic measurement apparatus 102 is tubular, and the one or more resilient members define a portion of the outermost surface of the wellbore characteristic measurement apparatus 102. In such embodiments, for example, the retention of the wellbore characteristic measurement apparatus 102 by the first retainer or second retainers 114, 116 is effected by engaging a feature of an inner surface 160 (such as, for example, a shoulder or a recess) within the passage defined within the wellbore characteristic measurement apparatus 102 with the first or second retainers 114, 116. In this respect, the displacement of the first and second retainers 114, 116 into their respective retaining positions is a displacement that is radially outwardly relative to the central longitudinal axis of the wellbore string 18. In some embodiments, for example, each one of the first and second retainers 114, 116, independently, includes a resilient member, such as a collet tab of a collet 140, and the displacement is urged by protuberances 142, 144 on the actuator 112. The first retainer 114 is urged into the retaining position upon alignment of the first protuberance 142 with the under surface of the collet tab 114 and the collet tab 116 is urged into the retaining position upon alignment of the second protuberance 144 with the under surface of the collet tab 116. Upon misalignment, the collet tabs 114, 116 revert to their respective retracted positions, owing to their natural bias.

In some embodiments, for example, the actuator 112 is displaceable from the dispensing prevention position to the dispensing promotion position in response to an applied pressure differential. In some embodiments, for example, the actuator 112 includes an actuator passage 118 configured to conduct a flow of fluid, supplied to the workstring 26, for generating the pressure differential between a first (e.g. uphole) end 120 and a second (e.g. downhole) end 122 of the actuator 112 while the received fluid flows from the first end to the second end.

In some embodiments, for example, a return spring 124 is provided to effect displacement of the actuator 112 from the dispensing promotion position such that the actuator 112 returns to the dispensing prevention position. The return spring 124 biases the actuator 112 towards the dispensing prevention position. In order to effect displacement of the actuator 112 from the dispensing prevention position to the dispensing promotion position, the pressure differential generated by the flowing fluid must be sufficient to impart a force that overcomes this spring bias. Relatedly, in order to the return of the actuator 112 to dispensing prevention position, the fluid flow, which has induced the pressure differential for effecting the displacement of the actuator 112 from the dispensing prevention position to the dispensing promotion position, is suspended to enable the natural bias of the return spring 124 to return the actuator 112 to the dispensing prevention position (see FIGS. 9A, 9B, and 11C).

In some embodiments, for example, the dispensing mechanism 110 includes a housing 126 for containing the collet 140, the actuator 112, and the return spring 124. The housing 126 is configured for coupling to the workstring 26 to enable deployment of the dispensing mechanism 110 into the wellbore string 18.

The housing 126 includes an upper mandrel 128, a lower mandrel 130, and a nose cone 132. The upper mandrel 128 is threadable at a first end 128A to the workstring 26 to effect coupling of the dispensing mechanism 110 to the workstring 26. The upper mandrel 128 is threaded at a second opposite end 128B to a first end 130A of the lower mandrel 130. The nose cone 132 is threaded to a second opposite end 130B of the lower mandrel 130. The lower mandrel 130 houses the actuator 112. The return spring 124 is contained within a space between the nose cone 132, the actuator 112 and the lower mandrel 130, and is biasing the actuator 112 towards a shoulder 134 defined within the lower mandrel 130. The actuator 112 is displaceable within the lower mandrel 130 between the return spring 124 and the shoulder 134.

The upper mandrel 128 defines an upper mandrel passage 136 for effecting fluid communication between the workstring 26 and the actuator 112, such that fluid is conductible to the actuator 112 via the workstring 26 for effecting the generation of the pressure differential that effects the displacement of the actuator 112 from the dispensing prevention position to the dispensing promotion position. The nose cone 132 includes slots 138 for discharging fluid, that is received by the actuator 112, from the dispensing mechanism 110, thereby ensuring flow for fluid that is received by the actuator 112.

The collet 140 is disposed about the lower mandrel 130 and is retained between the nose cone 132 and the upper mandrel 128. The collet tabs 114, 116 are engageable with the protuberances 142, 144 of the actuator 112, respectively, through respective slots 150A, 150B provided in the lower mandrel 130.

One or more wellbore characteristic measurement apparatus 102 are mountable to the dispensing mechanism 110 (FIGS. 11A to 11D are illustrative of an assembly 108 where three apparatuses 102A, 102B and 102C have been mounted). In order to mount a wellbore characteristic measurement apparatus 102, the upper mandrel 128 is unthreaded from the lower mandrel 130, and the wellbore characteristic measurement apparatus 102 is inserted over the lower portion of the dispensing mechanism 110. Because the actuator 112 is disposed in the dispensing prevention position, owing to the bias of the return spring 124, the mounted wellbore characteristic measurement apparatus 102 is prevented from sliding off the lower portion by the collet tab 114, which engages the wellbore characteristic measurement apparatus 102. Additional wellbore characteristic measurement apparatuses 102 may be mounted over the upper mandrel 128 to, in combination with the wellbore characteristic measurement apparatus 102 mounted over the lower mandrel 130, create a series of mounted wellbore characteristic measurement apparatuses 102. Once the desired quantity of wellbore characteristic measurement apparatuses 102 have been mounted over the mandrels, the upper and lower mandrels 128, 130 are threaded together to obtain the wellbore characteristic measurement assembly 108, which can then be threaded to the workstring 26, such as coiled tubing.

A process for deploying the wellbore characteristic measurement apparatus 102 will now be described.

The wellbore characteristic measurement assembly 108 is deployed into a wellbore 14 with coiled tubing. When the assembly 108 becomes disposed at a predetermined position within the wellbore 14 (such as, for example, adjacent to a predetermined flow communication stations within the wellbore 14), fluid is injected through the coiled tubing so as to effect displacement of the actuator 112 from the dispensing prevention position to the dispensing promotion position (see FIGS. 7A, 7B, and 11A). In parallel, the protuberance 142 becomes disposed out of alignment with the collet tab 114, thereby releasing the wellbore characteristic measurement apparatus 102A, and the protuberance 144 becomes aligned with the collet tab 16, urging the collet tab 16 into the retaining position, thereby effecting retention of the succeeding wellbore characteristic measurement apparatus 102B in the series. While pulling uphole on the coiled tubing and continuing to inject the fluid, the frictional drag of the wellbore string 18 on the wellbore characteristic measurement apparatus 102A (that has now been released) effects displacement of the wellbore characteristic measurement apparatus 102A, relative to the dispensing mechanism 110, in the downhole direction, such that the wellbore characteristic measurement apparatus 102 is dispensed from the assembly 108 and into the wellbore 14 (see FIGS. 8A, 8B, and 11B). Because the succeeding wellbore characteristic measurement apparatus 102B in the series has been retained by the collet tab, despite the frictional drag acting on the remaining non-deployed wellbore characteristic measurement apparatuses 102 in the series, all of the remaining non-deployed wellbore characteristic measurement apparatuses 102 remain retained to the dispensing mechanism 110. In order to enable dispensing of the succeeding wellbore characteristic measurement apparatus 102B in the series, the fluid flow being communicated to the actuator 112 via the coiled tubing is suspended so that the actuator 112 is able to be reset to the dispensing prevention position by the return spring 124 (see FIGS. 9A, 9B, and 11C). Once the actuator 112 is reset to the dispensing prevention position, and the assembly 108 is re-located uphole to the next predetermined location within the wellbore 14. The remaining non-dispensed wellbore characteristic measurement apparatuses 102 are displaced by frictional forces during the pulling up hole until they abut the collet tab 114 (see FIGS. 10A, 10B, and 11D). The dispensing of the succeeding wellbore characteristic measurement apparatus 102 in the series can be effected in a manner similar to that described above for the dispensing of the first wellbore characteristic measurement apparatus 102 in the series.

After all of the wellbore characteristic measurement apparatuses 102 have been deployed, and sufficient data has been collected, the wellbore characteristic measurement apparatuses 102 are retrieved from the wellbore 14 in order to process the data that has been acquired and stored within the data storage devices of the wellbore characteristic measurement apparatuses 102. In some embodiments, for example, to retrieve the wellbore characteristic measurement apparatuses 102, a spearing tool is deployed downhole via coiled tubing, spearing each one of the wellbore characteristic measurement apparatuses 102, through their respective passages, in succession. Once all of the wellbore characteristic measurement apparatuses 102 have been speared, they are returned to the surface by pulling out of hole with the coiled tubing.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A wellbore characteristic measurement assembly comprising:
   a dispensing mechanism; and
   a plurality of wellbore characteristic measurement apparatuses;
   wherein:
      each one of the wellbore characteristic measurement apparatuses, independently, is mountable to the dispensing mechanism in a releasably retained condition such that, while the assembly is conducted through a wellbore string, the plurality of wellbore characteristic measurement apparatuses are disposed for receiving application of frictional forces by the wellbore string; and
      the dispensing mechanism is configured for serially dispensing each one of the wellbore characteristic measurement apparatuses, independently, into the wellbore.

2. The assembly as claimed in claim 1;
   wherein the dispensing mechanism is actuatable for dispensing each one of the wellbore characteristic measurement apparatuses, independently, such that the dispensing is effected one at a time.

3. The assembly as claimed in claim 2, further comprising:
   a retainer for releasably retaining the wellbore characteristic measurement apparatuses to the dispensing mechanism, and configured, upon actuation, to effect release of at least one of the wellbore characteristic measurement apparatuses while continuing retention of all other ones of the wellbore characteristic measurement apparatuses.

4. The assembly as claimed in claim 3, further comprising: an actuator for effecting the actuation of the retainer.

5. The assembly as claimed in claim 4;
   wherein the actuator is resettable such that the actuation of the retainer is repeatable.

6. The assembly as claimed in claim 2, further comprising:
   a retainer for releasably retaining the wellbore characteristic measurement apparatuses to the dispensing mechanism, and configured, upon actuation, to effect release of a one of the wellbore characteristic measurement apparatuses while continuing retention of all other ones of the wellbore characteristic measurement apparatuses.

7. The assembly as claimed in claim 2, further comprising:
   a retainer for releasably retaining the wellbore characteristic measurement apparatuses to the dispensing mechanism, and configured, upon actuation, to effect release of at least one of a terminal ones of the wellbore characteristic measurement apparatuses while continuing retention of all other ones of the wellbore characteristic measurement apparatuses.

8. The assembly as claimed in claim 2, further comprising:
   a retainer for releasably retaining the wellbore characteristic measurement apparatuses to the dispensing mechanism, and configured, upon actuation, to effect release of a terminal one of the wellbore characteristic measurement apparatuses while continuing retention of all other ones of the wellbore characteristic measurement apparatuses.

9. The assembly as claimed in claim 1, further comprising:
   a magnetic collar locator for enabling the counting of collars in the wellbore string while the assembly is being moved through the wellbore.

10. A process for controlling the production of reservoir fluids from a reservoir, comprising:
    sensing one or more wellbore fluid characteristics with a wellbore characteristic measurement apparatus disposed within a wellbore;
    determining a high oil-water interface based on the sensed one or more wellbore fluid characteristics within a wellbore; and
    modulating material flow between the reservoir and the wellbore via a flow communication station that is disposed in close proximity to the wellbore characteristic measurement apparatus that has sensed the one or more wellbore fluid characteristics upon which the determination of the high oil-water interface is based;
    wherein:
       for each one of the sensed characteristics, transmitting a signal, representative of the sensed characteristic, to a data storage device disposed within the wellbore characteristic measurement apparatus based on the sensed characteristic such that the data storage device stores a value representative of the sensed characteristic; and retrieving the stored value for the determining by retrieving the wellbore characteristic measurement apparatus from the wellbore.

11. The process as claimed in claim 10;
    wherein the modulation includes effecting displacement of a flow control member within the wellbore.

12. A wellbore characteristic measurement assembly comprising:
    a dispensing mechanism;
    a plurality of wellbore characteristic measurement apparatuses; and a magnetic collar locator for enabling the counting of collars in a wellbore string while the assembly is being moved through a wellbore;

wherein:
- each one of the wellbore characteristic measurement apparatuses, independently, is mountable to the dispensing mechanism in a releasably retained condition; and
- the dispensing mechanism is configured for serially dispensing each one of the wellbore characteristic measurement apparatuses, independently, into the wellbore.

13. The assembly as claimed in claim 12;
wherein the dispensing mechanism is actuatable for dispensing each one of the wellbore characteristic measurement apparatuses, independently, such that the dispensing is effected one at a time.

14. The assembly as claimed in claim 13, further comprising:
a retainer for releasably retaining the wellbore characteristic measurement apparatuses to the dispensing mechanism, and configured, upon actuation, to effect release of at least one of the wellbore characteristic measurement apparatuses while continuing retention of all other ones of the wellbore characteristic measurement apparatuses.

15. The assembly as claimed in claim 14, further comprising:
an actuator for effecting the actuation of the retainer.

16. The assembly as claimed in claim 15;
wherein the actuator is resettable such that the actuation of the retainer is repeatable.

17. The assembly as claimed in claim 13, further comprising:
a retainer for releasably retaining the wellbore characteristic measurement apparatuses to the dispensing mechanism, and configured, upon actuation, to effect release of a one of the wellbore characteristic measurement apparatuses while continuing retention of all other ones of the wellbore characteristic measurement apparatuses.

18. The assembly as claimed in claim 13, further comprising:
a retainer for releasably retaining the wellbore characteristic measurement apparatuses to the dispensing mechanism, and configured, upon actuation, to effect release of at least one of a terminal ones of the wellbore characteristic measurement apparatuses while continuing retention of all other ones of the wellbore characteristic measurement apparatuses.

19. The assembly as claimed in claim 13, further comprising:
a retainer for releasably retaining the wellbore characteristic measurement apparatuses to the dispensing mechanism, and configured, upon actuation, to effect release of a terminal one of the wellbore characteristic measurement apparatuses while continuing retention of all other ones of the wellbore characteristic measurement apparatuses.

20. A wellbore characteristic measurement assembly comprising:
a dispensing mechanism; and
a plurality of wellbore characteristic measurement apparatuses;
wherein:
- each one of the wellbore characteristic measurement apparatuses, independently, is mountable to the dispensing mechanism in a releasably retained condition; and
- the dispensing mechanism is operable between:
  - a dispensing prevention position wherein, while the assembly is conducted through a wellbore string, the plurality of wellbore characteristic measurement apparatuses are disposed for receiving application of frictional forces by the wellbore string and the dispensing mechanism is configured for opposing the frictional forces applied by the wellbore string such that the wellbore characteristic measurement apparatuses are retained by the dispensing mechanism; and
  - a dispensing promotion position wherein, while the assembly is conducted through the wellbore string and the plurality of wellbore characteristic measurement apparatuses are disposed for receiving application of frictional forces by the wellbore string, the dispensing mechanism is configured such that the frictional forces effect displacement of at least one of one or more terminal ones of the plurality of wellbore characteristic measurement apparatuses such that at least one of the terminal ones of the plurality of wellbore characteristic measurement apparatuses are dispensed from the assembly while the dispensing mechanism opposes the frictional forces applied by the wellbore string to the other ones of the plurality of wellbore characteristic measurement apparatuses such that they remain retained by the dispensing mechanism, the dispensing mechanism thereby configured for serially dispensing each one of the wellbore characteristic measurement apparatuses, independently, into the wellbore.

21. The assembly as claimed in claim 20, further comprising:
an actuator;
a first retainer; and
a second retainer;
wherein the actuator, the first retainer and the second retainer are cooperatively configured such that:
- while the dispensing mechanism is disposed in the dispensing prevention position, the actuator urges the first retainer into a retaining position for opposing the frictional forces being applied by the wellbore string to the plurality of wellbore characteristic measurement apparatuses while the assembly is being conducted through the wellbore such that the plurality of wellbore characteristic measurement apparatuses are retained; and
- while the dispensing mechanism is disposed in the dispensing promotion position, the actuator is disposed such that the urging of the first retainer into the retaining position is defeated with effect that the frictional forces effect displacement of at least one of the terminal ones of the plurality of wellbore characteristic apparatuses, the actuator urging the second retainer into a retaining position such that the second retainer opposes the friction forces applied to the other ones of the plurality of wellbore characteristic measurement apparatuses such that they remain retained.

22. The assembly as claimed in claim 21, wherein:
the dispensing of the at least one of the terminal ones of the plurality of wellbore characteristic apparatuses from the dispensing mechanism into the wellbore is with effect that the dispensing mechanism is re-set into the dispensing prevention position.

23. The assembly as claimed in claim 20, further comprising:
   a magnetic collar locator for enabling the counting of collars in the wellbore string while the assembly is being moved through the wellbore.

\* \* \* \* \*